United States Patent [19]

Goto et al.

[11] Patent Number: 5,585,619
[45] Date of Patent: Dec. 17, 1996

[54] WIRELESS INPUT SYSTEM FOR COMPUTER USING ELEVATED FOUR-DIVISION PHOTODETECTOR

[75] Inventors: Hideo Goto, Saitama-ken; Manabu Fujita, Kanagawa-ken, both of Japan

[73] Assignee: Data Stream Corporation, Tokyo, Japan

[21] Appl. No.: 569,665

[22] Filed: Dec. 8, 1995

Related U.S. Application Data

[63] Continuation of Ser. No. 288,868, Apr. 18, 1994, abandoned.

[30] Foreign Application Priority Data

Jul. 8, 1993 [JP] Japan ................................ 5-164191

[51] Int. Cl.⁶ .................................................. H01J 40/14
[52] U.S. Cl. ........................................ 250/206.2; 250/221
[58] Field of Search ...................... 250/206.2, 227.13, 250/221, 206.1, 561, 559.29, 559.31; 356/152, 152.1, 147; 340/870.16, 870.19, 870.2; 359/157, 184

[56] References Cited

U.S. PATENT DOCUMENTS

| | | | |
|---|---|---|---|
| 3,723,013 | 3/1973 | Stirland et al. | 250/206.2 |
| 5,001,557 | 3/1991 | Begle | 250/221 |
| 5,025,516 | 6/1991 | Wilson | 250/221 |
| 5,027,115 | 6/1991 | Sato et al. | 250/227.13 |
| 5,227,622 | 7/1993 | Suzuki | 250/221 |

*Primary Examiner*—Que T. Le
*Attorney, Agent, or Firm*—Ostrager, Chong & Flaherty

[57] ABSTRACT

A wireless input system for a computer includes a pen-type input device and an input device body. The pen-type input device comprises a light emitting element for emitting a pulse of light. The input device body comprises at least one optical system unit including a light receiving element for receiving the pulse of light emitted from the light emitting element of the pen-type input device and a circuit for calculating the outputs from the light receiving element to obtain the position abscissa of the pen-type input device.

7 Claims, 10 Drawing Sheets

LENS SYSTEM (CIRCULAR APERTURE)

| X | Z=100(mm) | Z=200(mm) | Z=300(mm) | | k | c (=k*z) |
|---|---|---|---|---|---|---|
| 0 | 0 | 0 | 0 | Z=100 | 0.017074 | 1.707429 |
| 10 | 0.182 | 0.101 | 0.064 | Z=200 | 0.009406 | 1.881143 |
| 20 | 0.359 | 0.187 | 0.138 | Z=300 | 0.006271 | 1.881429 |
| 30 | 0.532 | 0.282 | 0.189 | | AVERAGE | 1.823333 |
| 40 | 0.698 | 0.380 | 0.252 | STANDARD DEVIATION | | 0.081957 |
| 50 | 0.851 | 0.472 | 0.316 | | | |

WIRELESS INPUT SYSTEM FOR COMPUTER USING ELEVATED FOUR-DIVISION PHOTODETECTOR

This is a continuation of U.S. patent application Ser. No. 08/288,868, filed on Apr. 18, 1994, now abandoned.

BACKGROUND OF THE INVENTION

This invention relates to a wireless input system for a computer. More particularly, it relates to a wireless input system for a computer which comprises, in combination, a pen-type input device having a light emitting element for emitting a pulse of light and an input device body for receiving the pulse of light emitted from the pen-type input device and calculating the position abscissa of the pen-type input device on the basis of the received pulse. Although the input device having the light emitting device is herein referred to as "pen-type input device" in order to distinguish it from the input device body, the outer shape or outline of the pen-type input device may be of any type, and is not limited to the pen-like shape.

The above-mentioned wireless input system for a computer has an optical system unit disposed in the input device body for detecting the light emitted from a source of light in the pen-type input device. The optical system unit usually comprises an optical filter, a lens, a lens holder which has an opening functioning as an aperture, and a photodetector. Such optical system units are disclosed in the commonly owned U.S. Pat. No. 5,166,668 of Aoyagi.

Figure 12:
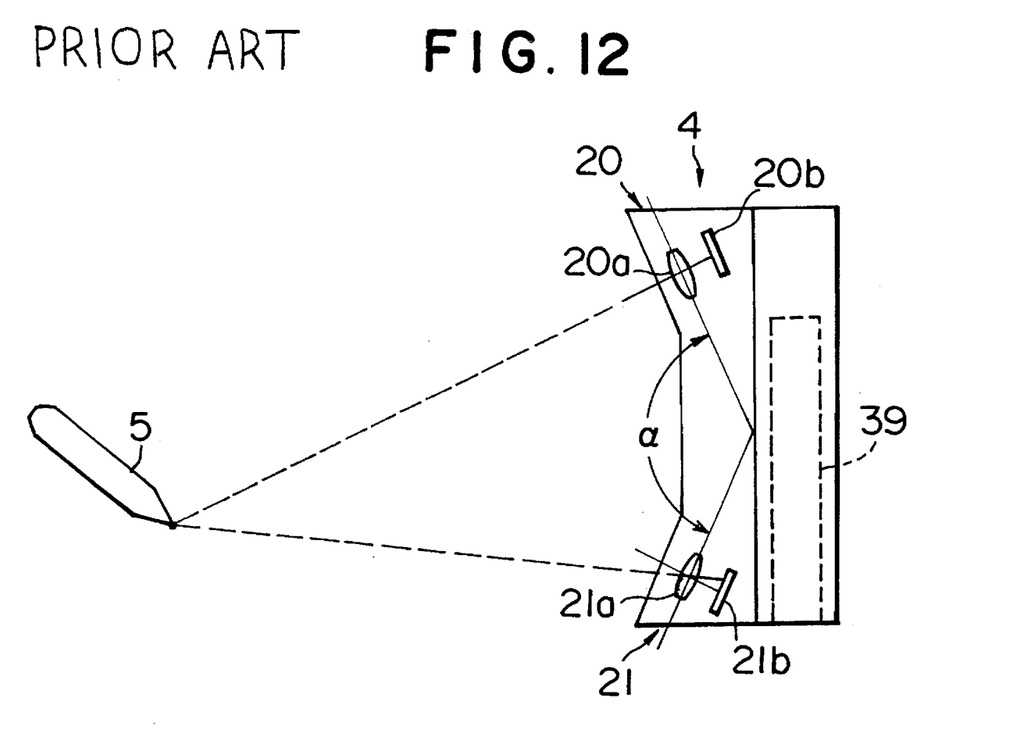
FIG. 12 is a cross-section view showing a conventional optical system unit.

FIG. 12 shows the disclosed optical system units. As shown in FIG. 12, the optical system units of the input device body 4 include lenses 20a and 21a, and photodetectors or light receiving elements 20b and 21b. Furthermore, optical filters and lens holders are omitted in FIG. 12. Other elements depicted include the light pen 5 and a holder receptacle 39.

Furthermore, with such a conventional construction, there is a problem that the cost of parts greatly increases since two optical system units are used. Furthermore, with the system for processing a signal of very weak light similar to that of the present invention, I/V amplifiers with great amplification are usually used. Consequently, the system is affected by electromagnetic noises from peripheral electronic devices, which would result in malfunctions.

In order to reduce electromagnetic noises, it is required to completely shield the optical system unit from the outside, which leads to greater size of the device and higher cost of parts, and it is therefore difficult to realize a wireless input system for a computer which merely requires a small space, has a high precision and is low in cost.

SUMMARY OF THE INVENTION

It is, therefore, an object of the invention to provide a wireless input system for a computer which can input information (two-dimensional information) to a computer by one optical system unit.

It is another object of the invention to provide a wireless input system for a computer which merely requires a small space, has a high precision and is low in cost.

In order to accomplish these objects, there is provided a wireless input system for a computer including a pen-type input device and an input device body in which said pen-type input device comprises a light emitting element for emitting a pulse of light, and said input device body comprises at least one optical system unit including a light receiving element for receiving the pulse of light emitted from said light emitting element of the pen-type input device and means for calculating the outputs from the light receiving element to obtain the position abscissa of the pen-type input device.

BRIEF DESCRIPTION OF THE DRAWINGS

The present invention will be now described in detail with reference to the preferred embodiments illustrated in the accompanying drawings in which.

DESCRIPTION OF THE PREFERRED EMBODIMENTS

Figure 1:
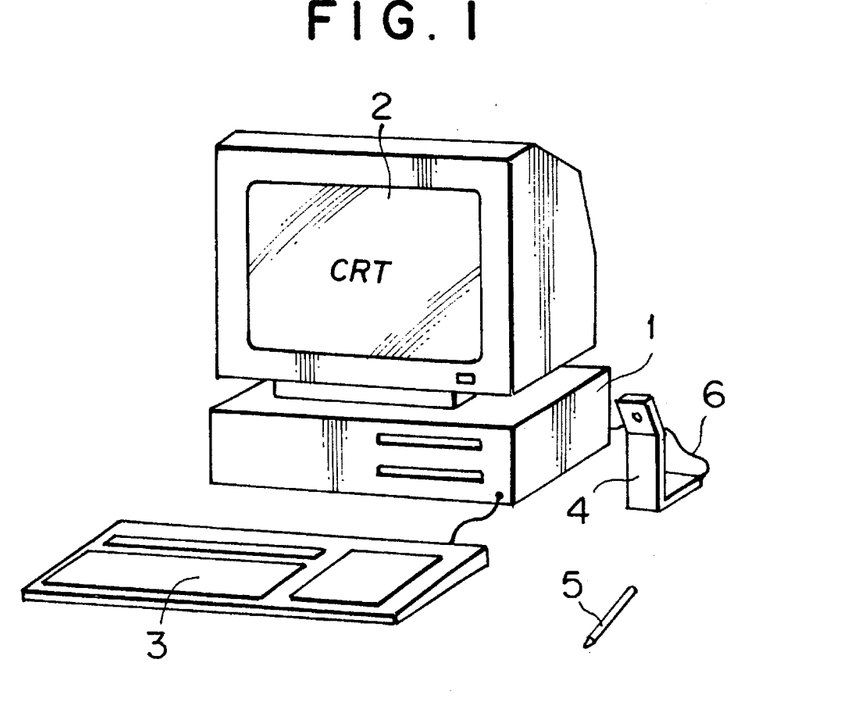
FIG. 1 is a perspective view showing a wireless input system for a computer comprising an input device body having a single optical system unit and a pen-type input device according to the present invention, and a personal computer which the wireless input system is applied to, FIG. 2 is an enlarged perspective view showing an input device body.
Figure 2:
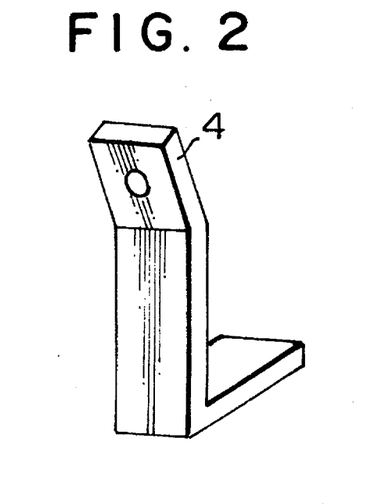

Referring to FIGS. 1 and 2, there is shown a wireless input system for a computer which is utilized together with an existing computer. In FIG. 1, an input device body 4 disposed on a suitable support such as a desk is connected through a mouse cable 6 to a personal computer body 1 which is in turn connected to a CRT 2 and a keyboard 3. As shown in FIG. 2, the input device body 4 has a detector or a light receiving element, not shown in FIG. 2, which is disposed at an angle relative to a working surface. The input device body 4 is adapted to receive the light through a lens, not shown in FIG. 2, from a light emitting element, not shown in FIG. 2, of the pen-type input device 5 (see FIG. 1). Furthermore, a charged-type battery or a non-charged-type battery is used as a source of power of the pen-type input device 5.

The wireless input system thus constructed, that is, a combination of the input device body 4 and the pen-type input device 5 is used for a desk top computer instead of a mouse or a tablet.

Figure 3:
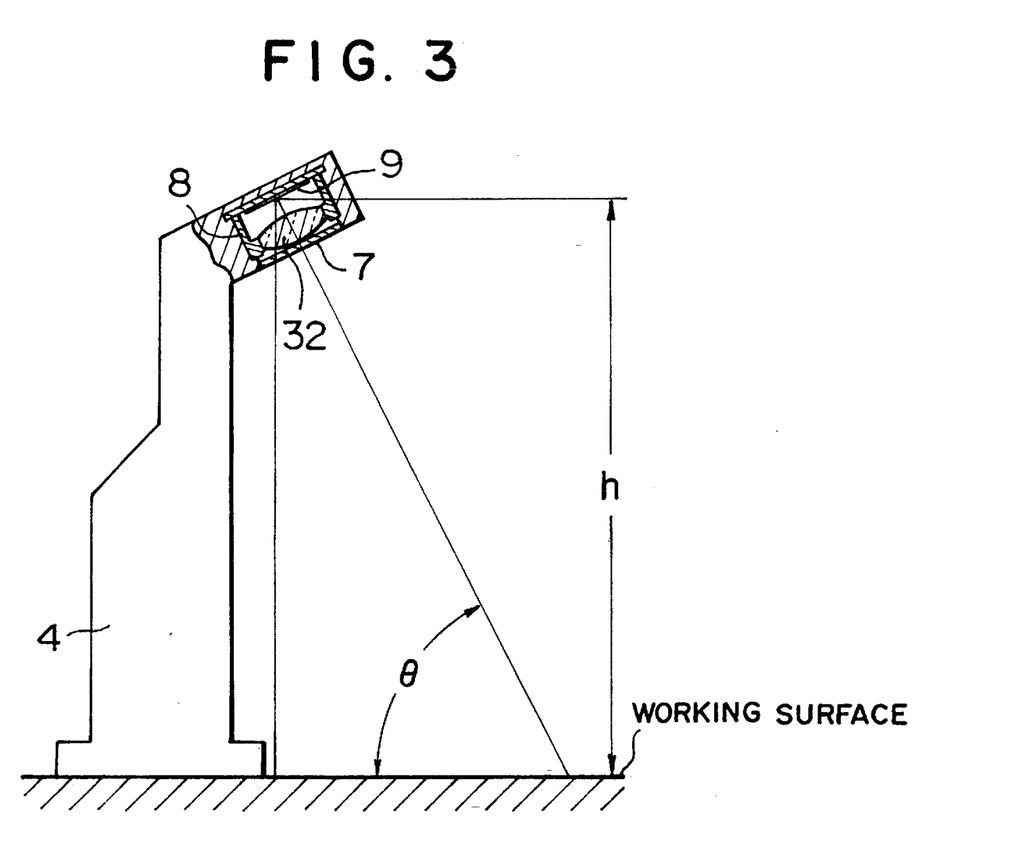
FIG. 3 is a cross-section view of an input device body.

Referring to FIG. 3, the input device body 4 is in the form of a box-like casing which has its upper portion projecting upward and outward as an arm. The surface or wall of the upper portion opposite to the working surface is formed with an opening. Within the upper portion disposed are an optical filter 7 for shielding optical noises from the outside, a lens 32 for focusing the light from the pen-type input device 5 (see FIG. 1) into a suitable size of spot, a lens holder, having an opening as an aperture, for supporting the lens 32, and a light receiving element 9 for receiving the focused light.

Furthermore, although the optical filter is attached to the input device body 4 as shown in FIG. 3, the optical filter 7 may be integrally formed with an optical system unit comprising the lens 32, the light receiving element and the like, and the unit may be attached to the input device body 4, instead.

The light receiving element 9 comprises a light-electric transducer for position detection such as a four-division photodiode for transducing the quantities of light on the image formation positions or four-division portions thereof into electric signals, and is disposed on the same axis as its optical axis to detect the light image. The light receiving element 9 is positioned at a predetermined angle relative to a vertical line at the height h from the working surface. Consequently, the position of the pen-type input device 5 is calculated on the basis of the quantities of light received by the light receiving element, as described later. Regarding two-dimensional position detection, one face-type light-electric transducer for position detection (a photodetector, a four-division photodetector) may be used. By additional provision of at least one line-type light-electric transducer (for example, two-division photodiode) or a face-type one, that is, another four-division photodetector, three-dimensional position detection can be made. Furthermore, the input device body 4 has other function elements, described in detail hereinafter.

The configuration of the pen-type input device 5 is the same as that disclosed in the above-mentioned U.S. Pat. 5,166,668. Since the detailed explanation on the pen-type input device is made in the Patent, a brief explanation will be made for reference. The pen-type input device 5 has a light emitting element (an electric-light transducer) such as an LED at the leading end thereof, a suitable number of click switches, a power switch and terminals for charge at the front portion thereof.

The light emitting element transduces position information and click information into light to emit the same in accordance with instructions from the control circuit, not shown. For example, when the click switch is depressed, the control circuit is supplied power and position information pulse generated within the inside of the pen-type input device is emitted. Furthermore, since the light receiving element is responsive to a visible light, a filter 7 is provided to pass only the light of a specific wavelength (usually, infra-red) from the pen-type input device. The click switches, when depressed by a finger, cause the light emitting element to start the emitting of the light, and at the same time accomplish functions as a click-on switch and a click-off switch. In such a case, where either one of the click switches is not depressed for a predetermined period, additional consumption of power is prevented by the provision of the function which stops the supply of power to the control circuit, even without the provision of the power switch. The number of click switches is not limited and another power switch may be provided for shutting out the supply of power to the control circuit.

Figure 4:
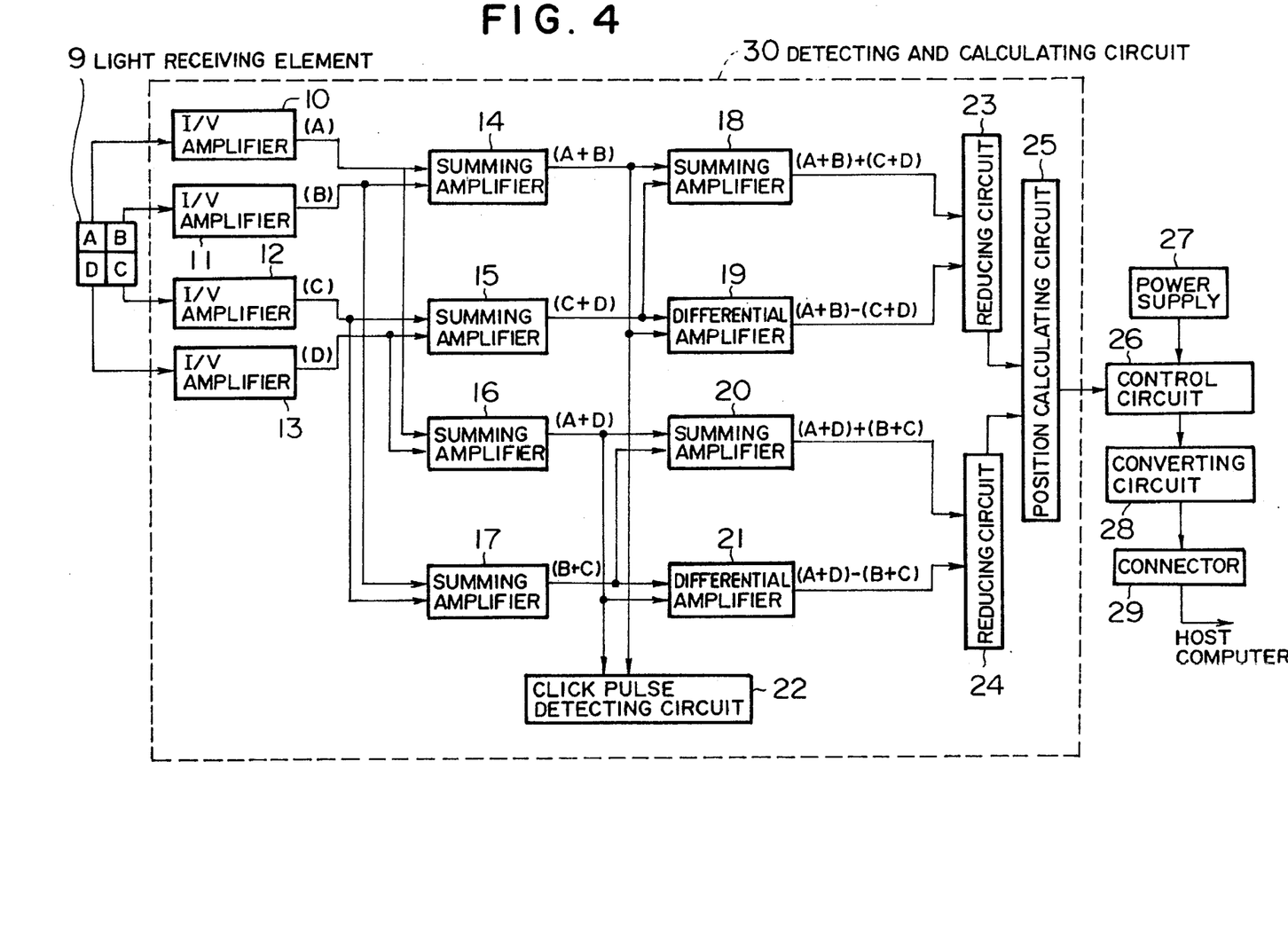
FIG. 4 is a circuit block diagram of an input device body.

Referring now to FIG. 4, there is shown a circuit block diagram of the input device body 4. As mentioned above, the light receiving element 9 receives the light from the pen-type input device 5. More particularly, the portions A, B, C and B of the four-division photodiode, respectively, receive the light. The light receiving element 9 is connected to a detecting and calculating circuit 30 which comprises I/V amplifiers 10, 11, 12 and 13, summing amplifiers 14, 15, 16, 17, 18 and 20, differential amplifiers 19 and 21, reducing or dividing amplifiers 23 and 24, a click information detecting circuit 22 and a position calculating circuit 25. The amplifiers 10, 11, 12 and 13 convert light current received and generated by the light receiving element, that is, the four-division photodiode to voltages and to output the same, described in detail later. For easy understanding, the voltages generated at each portion A, B, C and D of the light receiving element 9 is indicated at A, B, C and D in FIG. 4.

The summing amplifiers 14, 15, 16 and 17 add two outputs outputted from the right and left portions of the light receiving element to each other, and also add two outputs outputted from the upper and lower portions of the light receiving element to each other. The summing amplifiers 18 and 20 each adds the output outputted from the pre-stage summing amplifiers to another one. The differential amplifiers 19 and 21 each subtracts the output outputted from one of the pre-stage amplifiers from another one. The reducing amplifiers 23 and 24 each reduces the output obtained from the differential amplifiers 19 or 21 by the output obtained from the summing amplifiers 18 or 20. The click pulse detecting circuit 22 detects whether the converted electric signals include the click pulse information. The detection of the click pulse can be made by judging the output from the light receiving element 9 since the incoming light is modulated by the pen-type input device. Furthermore, the position calculating circuit 25 calculates the position of the pen-type input device on the basis of information of the ratio of quantities of the light from the reducing amplifiers 23 and 24, and other constants.

The position calculation circuit 25 of the detecting and calculating circuit is connected through a control circuit 26 and a converting circuit 28 to a host computer 31 (which corresponds to a personal computer body 1 shown in FIG. 1). The control circuit 26 controls operations of the input device body as a whole and the converting circuit 28 may include a mouse pulse generating circuit, not shown, in case where the present device is used in place of a conventional mouse. The mouse pulse generating circuit generates signal pulses corresponding to the relative movement information of the conventional mouse from the values calculated by the position calculating circuit. The mouse pulse generating circuit is also an interface circuit to the host computer, and the interface circuit takes the click pulse information detected by the click pulse detecting circuit into the mouse pulse together with the relative movement information. Furthermore, when the present device is used as an absolute abscissa input device such as a tablet, the converting circuit 28 is provided with an absolute position pulse generating circuit, not shown, which generates a signal pulse including the absolute position information of the conventional tablet and the click information from the values calculated by the position calculating circuit 25.

A connector 29 transfers the mouse pulse (including the relative movement information and the click information) generated by the converting circuit 28 through the mouse cable to the personal computer body 1 and supplies power from the personal computer body 1 to the input device body. A power supply circuit 27 supplies power to the control circuit and other functional elements.

The principle of calculation of position according to the present invention will be explained with reference to FIGS.

Figure 5:
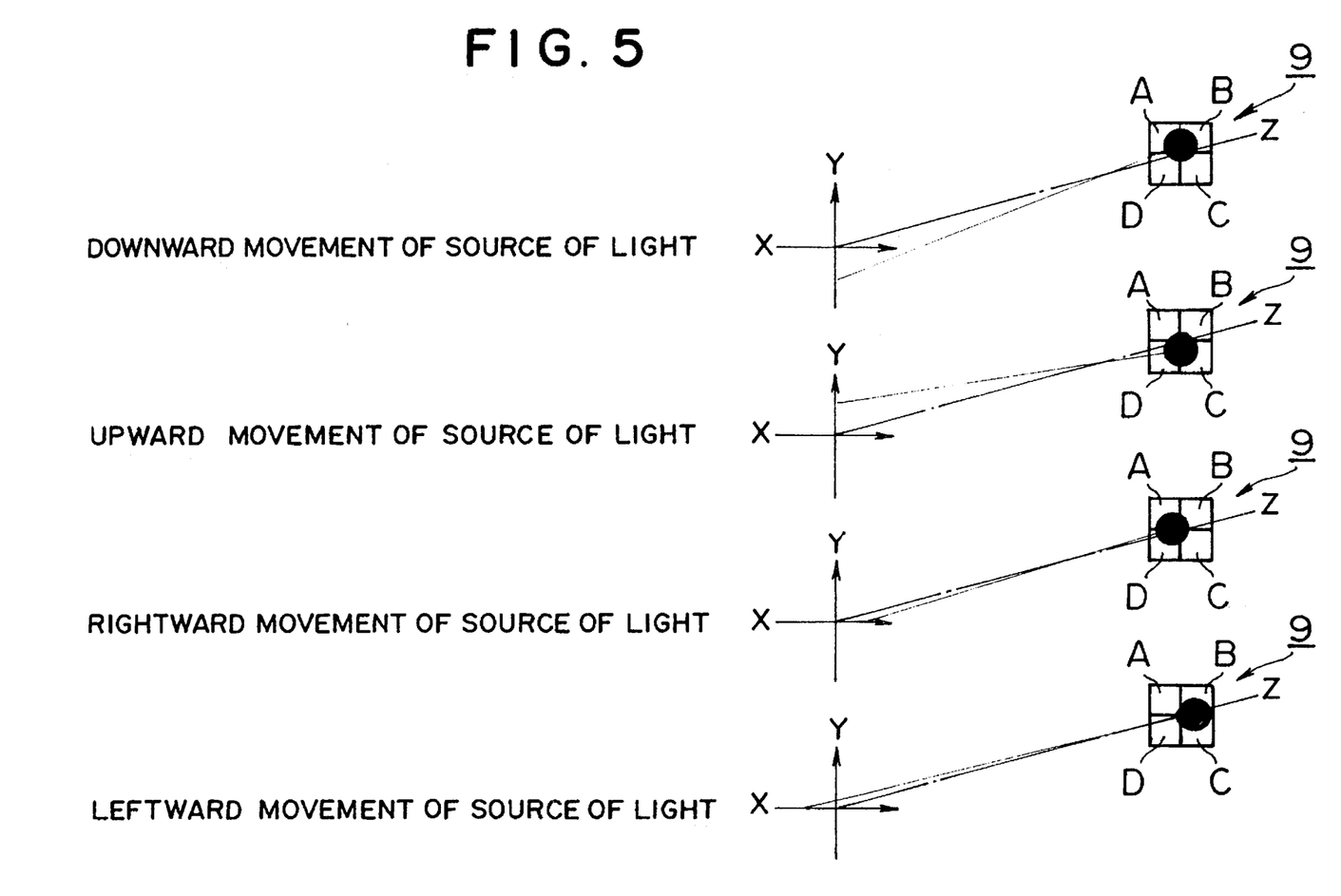
FIG. 5 is a diagrammatic view for explanation of the movement of a light spot on a detector in response to movement of the source of light.

5 through 8. FIG. 5 is for explanation on principle of calculation of position. As shown in FIG. 5, when the source of light of the pen-type input device moves downward, the spot on the photodetector or the light receiving element moves upward, when the source of light moves upward, the spot moves downward, when the source of light moves to the right, the spot moves to the left and when the source of light moves to the left, the spot moves to the right.

The parameters which are set to calculate the position (abscissa) of the pen-type input device are as follows:

(1) optical factor c: it depends on the properties of a lens (shape and refractive index), the shape of an aperture and distance between a light receiving element and lens, and is required to obtain angle information from the output ratio of the detector, (2) distance between the detector and the working surface: $Z_o$, and (3) inclination of the detector: θ

Figure 6:
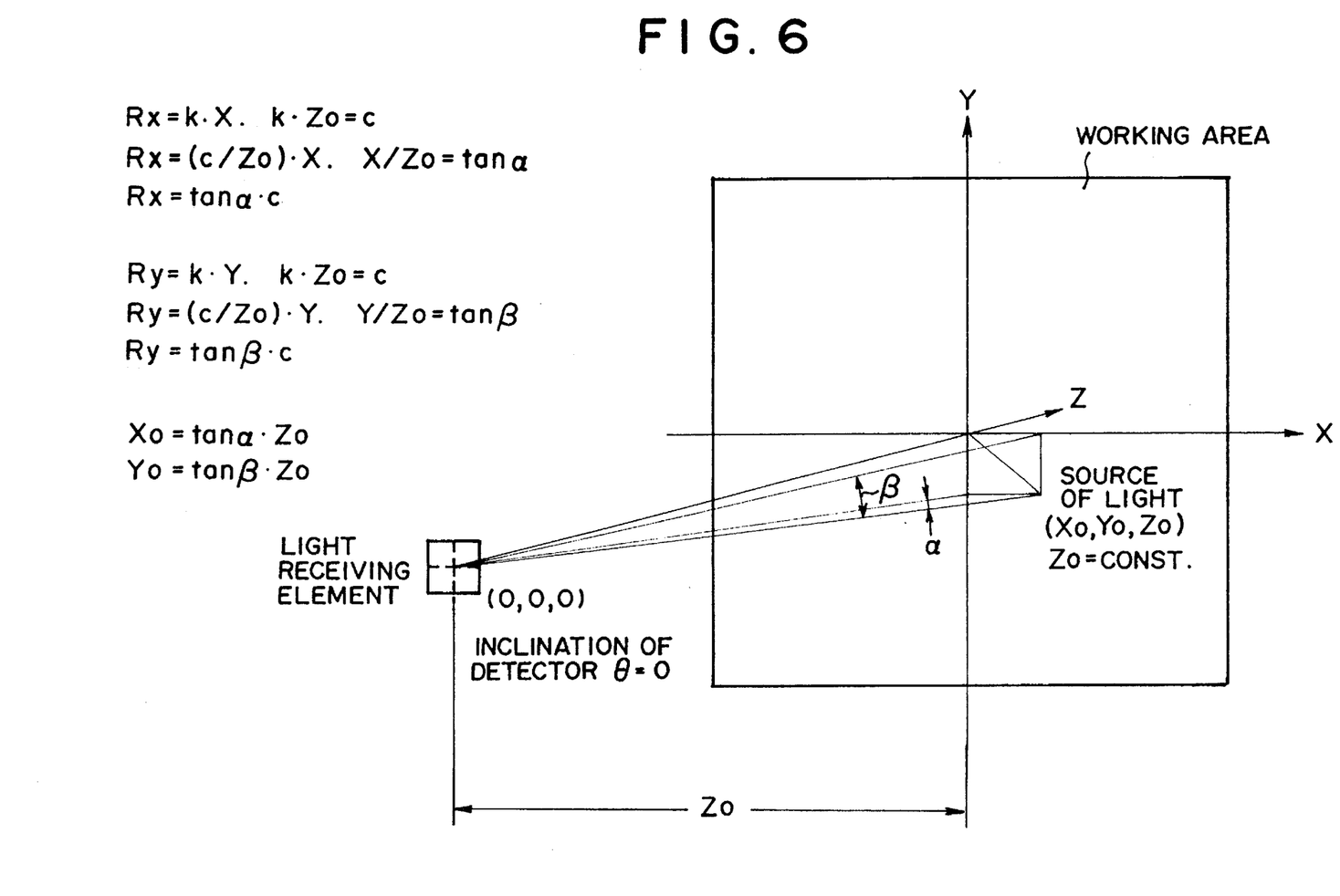
FIG. 6 is a diagrammatic view for explanation of procedures for calculation of position abscissa.

FIG. 6 shows an abscissa system of an optical system in which the position is calculated. The following two equations are derived from the abscissa system:

$$X_o = \tan \alpha \cdot Z_o \quad (1)$$

$$Y_o = \tan \beta \cdot Z_o \quad (2)$$

Therefore, the intersection abscissa can be obtained from the equations 1 and 2.

When the distance Z is set to be constant, it is found that a relatively exact proportional relationship exsists between the ratio Rx of the difference between the output [(A+D)−(B+C)] between the output (A+D) and output (B+C) of four outputs of the four-division photodetector to the sum [(A+D)+(B+C)] of the output (A+D) and output (B+C) thereof and the distance in the direction of G when the optical system is properly designed. Similarly, it is found that a relatively exact proportional relationship exists between the ratio Ry of the difference [(A+B)−(C+D)] between the output (A+B) and output (C+D) of four outputs of the four-division photodetector to the sum [(A+B)+(C+D)] of the output (A+B) and output (C+D) thereof and the distance in the direction of Y when the optical system is properly designed. This is clear from FIG. 8. Moreover, it is also clear that the product of the inclination of the graph k and the position of Z is a constant c.

Figure 8:
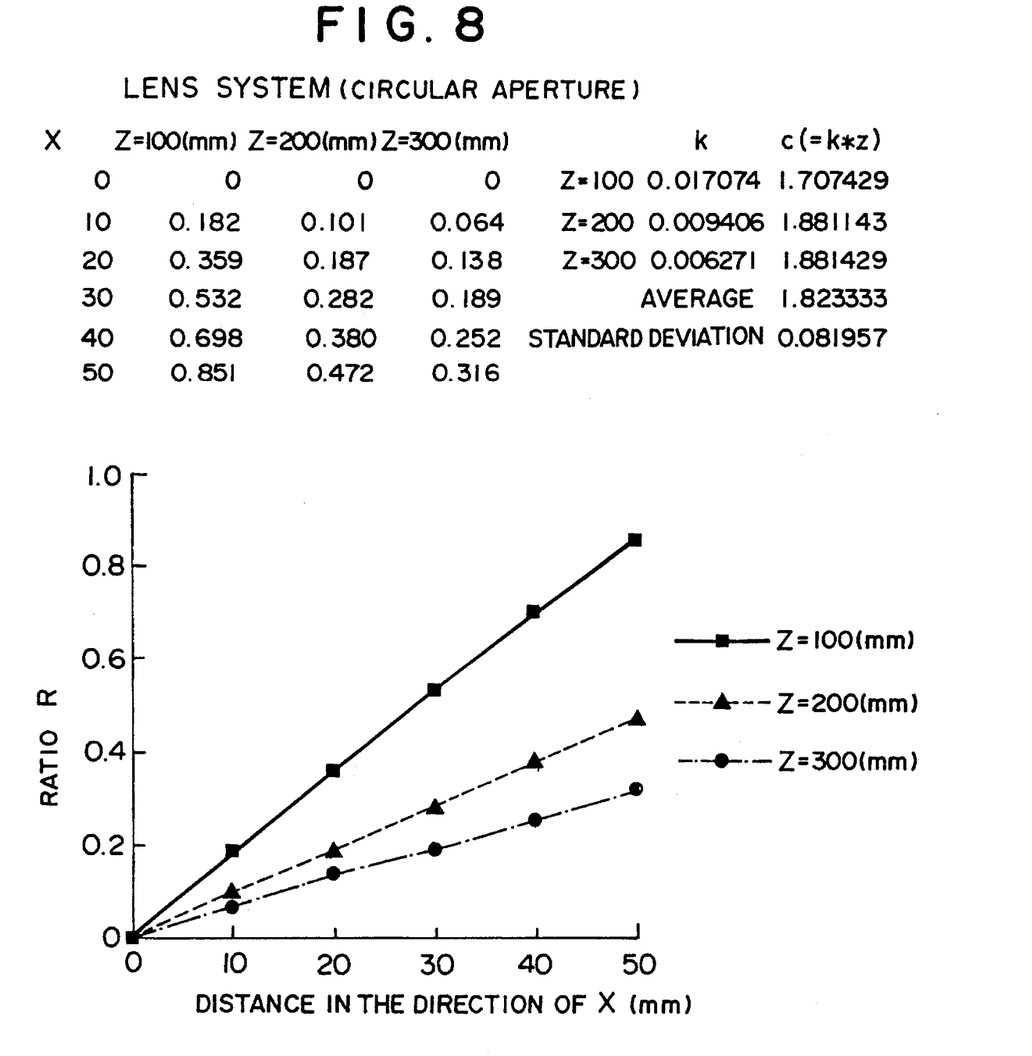
FIG. 8 is a graph for determining one of the parameters used in calculation of position abscissa.

From the graph, R=k·X and k·(position of Z) ≈ c. Consequently, when these relations are applied to the direction of X, the following equations are derived:

$$X/(\text{position of } Z) = \tan \alpha = Rx/c, \text{ and}$$

$$Rx = [(A+D)-(B+C)]/[(A+D)+(B+C)]$$

Thus, the value of tan α can be derived from the difference between the outputs (A+D) and (B+C) of the four-division photodiode, and the sum of the outputs (A+D) and (B+C) thereof. In a similar manner, the value of tan β can be derived from the difference between the outputs (A+B) and (C+D) of the four-division photodiode, and the sum of the outputs (A+B) and (C+D) thereof. Furthermore, in case where the shape of the lens is not a special one (for example, in case of a simple R lens), a common optical factor c can be applied in both directions of X and Y.

Procedures of calculation of position will now he explained. At a preparatory stage, each parameter is set, and the product c (optical factor) of the inclination of the graph k of R-X line (for example, FIG. 8) and the position of Z, and inclination θ of the detector are previously obtained by calculation. From the quantities of light (A, B, C and D) received by the photodetector from the light emitting element, the differential outputs [(A+D)−(B+C)] and [(A+B)−(C+D)], and the sum outputs [(A+D)+(B+C)] and [(A+B)+(C+D)] and are obtained using the sum amplifiers 14, 15, 16 and 17, the sum amplifiers 18 and 20, and differential amplifiers 19 and 21. From these outputs, the ratio Rx in the direction of X and the ratio Ry in the direction of Y are obtained using the reducing circuits 23 and 24, and the position calculating circuit 25 and then the values of tan α and tan β are derived. Using these values and previously obtained values c and θ the values of the intersection ($X_o$, $Y_o$) on the working surface area (Z plane) are calculated. Furthermore, FIG. 6 shows an abscissa system of an optical system in case where the inclination θ of the detector is equal to zero.

Figure 7A:
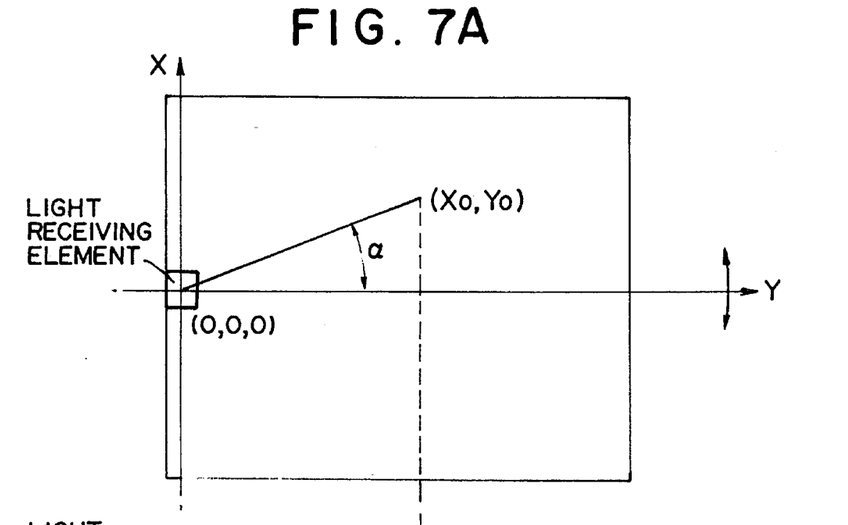
FIGS. 7A and 7B is diagrammatic view for explanation of procedures for calculation of position abscissa.
Figure 7B:
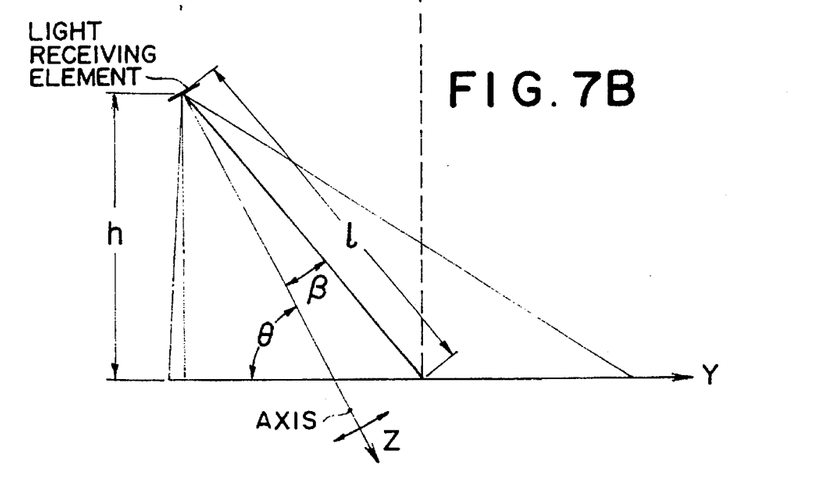

Referring to FIG. 7, the procedures of calculation of position in case where the center of the optical axis of the light receiving element is located at the height h from the working surface and the optical axis of the light receiving element is inclined at the angle θ relative to the working surface will be explained. Such a case may correspond to the case where the input device body is disposed on the working surface such as a table and the pen-type input device is moved on or above that surface. In this abscissa system, the following two equations are derived:

$$X_o = \tan \alpha \cdot (h^2 + Y_o^2)^{1/2}, \text{ and} \quad (3)$$

$$Y_o = \tan ((\pi/2) - \theta + \beta) \cdot h, \quad (4)$$

The angles α and β of the source of light to optical axis in the directions X and Y can be obtained in a similar manner to the aforegoing. Since the values of θ and h in the equation 4 are known, $Y_o$ can be obtained, and then by substituting the value of $Y_o$ for the equation 3, the value of $X_o$ can be obtained.

Referring again to FIG. 8, FIG. 8 shows the relation between distance in the direction of X and the ratio R, and the value of c in each case of Z=100, 200 and 300 mm when a simple lens is disposed through a lens holder (having an opening as an aperture) in front of the photodetector to enhance focusing ability.

Figure 9:
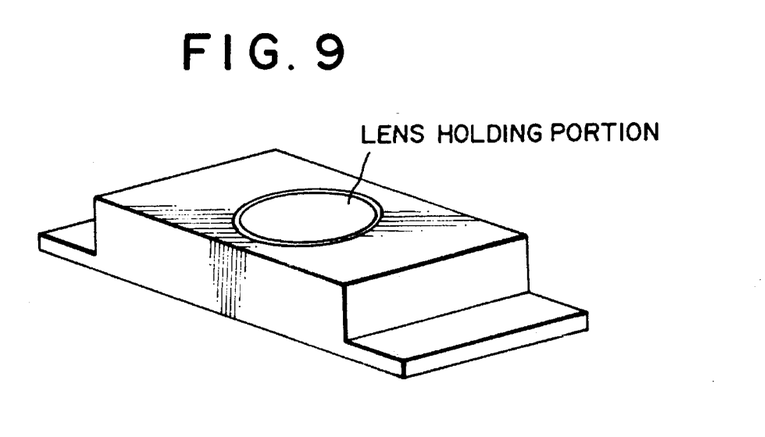
FIG. 9 is a perspective view showing a lens holder having an opening functioning as an aperture.
Figure 10:
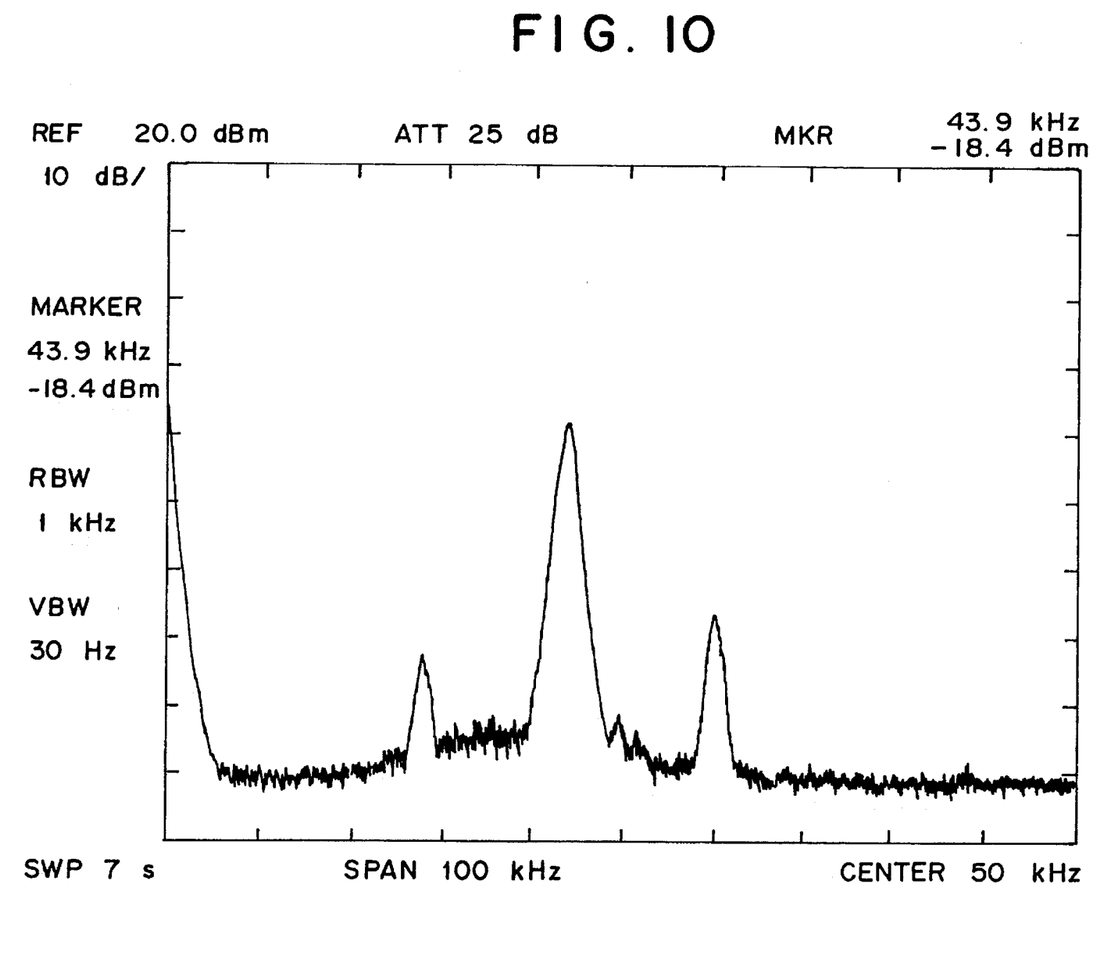
FIG. 10 is a graph showing a frequency spectrum for the detector output when resin is used as a material of the lens holder.
Figure 11:
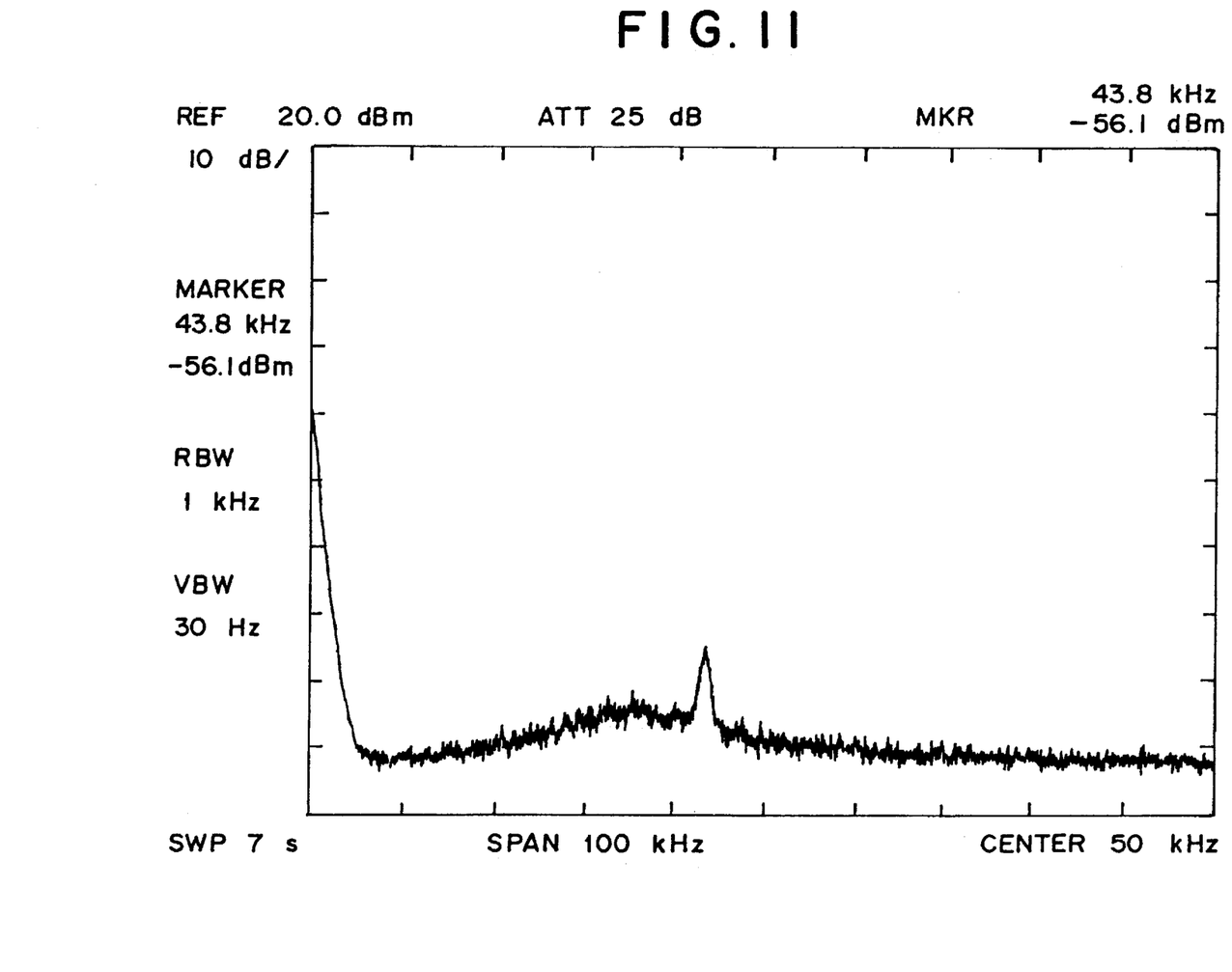
FIG. 11 is a graph showing a frequency spectrum for the detector output when aluminum is used as a material of the lens holder.

FIG. 9 is a perspective view of a lens holder (also having a function of an aperture) which is preferably used in the present invention. FIG. 10 is a graph showing a frequency spectrum for the detector output when a usual resin is used as a material of the lens holder. Recently, many electric instruments are frequently used, and some of them may generate electromagnetic noises to a great extent. The peaks noticed in FIG. 10 are generated due to the noises. FIG. 11 is a graph showing a frequency spectrum for the detector output when aluminum is used as a material of the lens holder, which is connected to the ground of the circuit, in order to reduce such noises. It is clear from FIG. 11 that by substitution of material, two smaller peaks due to the noises are completely eliminated and the greatest peak is reduced approximately 38 dB. Alternatively, the lens holder made of resin is sprayed with electromagnetic guard spray (for example, manufactured by 3M) Company of Minneapolis, Minn. or the lens holder is made of resin having a shielding effect (for example, manufactured by Teijin Kasei) Company of Japan. It is found that similar effects are obtained by these processes.

Although the above-mentioned explanation is directed to the detection of two-dimensional plane abscissa using one light receiving optial system (including an optical filter, a lens holder, a lens photodetector and the like), by addition of a similar optical system to the input device body, the detection of a three-dimensional space abscissa with low cost, high precision and high stability can he realized.

As mentioned above, since in accordance with the present invention, one light receiving element is used in the wireless input system for a computer, the input device body of the wireless input system can be made conpact.

Furthermore, since the lens holder is used in the optical system unit the input device body and the lens holder itself is provided with shielding effects, the wireless input system for a computer which can be compact in size, low in cost, resistant to noises from the outside by reducing the number of parts compared with conventional system using two optical systems.

What we claim:

1. A wireless input system for a computer for use in position abscissa detection relative to a planar working surface, comprising:

a light emitting input device for emitting a pulse of light indicative of a position of said input device on the planar working surface;

an input device body having a lower casing placed on surface adjacent to the planar working surface and an upper arm portion projecting upwardly and outwardly from said lower casing so as to be elevated adjacently above the planar working surface;

an optical detection unit mounted to the end of said upper arm portion at a predetermined height $h$ above and facing at a predetermined acute inclination angle $\theta$ toward the planar working surface, said optical detection unit including a single four-division light receiving element having four light receiving portions for generating four respective detection outputs indicative of light quantities received from a pulse of light emitted by the light emitting input device from its position on the planar working surface; and calculation means operatively coupled to receive said four light quantity detection outputs from said optical detection unit for calculating position abscissa coordinates of said light emitting input device based upon said detection outputs.

2. A wireless input system for a computer according to claim 1, further including a lens disposed in front of the light receiving element for focusing the light.

3. A wireless input system for a computer according to claim 2, further including a lens holder for supporting said lens.

4. A wireless input system for a computer according to claim 2, in which said lens holder is made of a shielding material for shielding electromagnetic noises from peripheral electronic instruments.

5. A wireless input system for a computer according to claim 2, in which said lens holder is covered with a shielding material for shielding electromagnetic noises from peripheral electronic instruments.

6. A wireless input system for a computer according to claim 2, in which said lens holder is integrally formed with an optical filter for removing optical noises due to the light from outside.

7. A wireless input system for a computer according to claim 1, in which said light receiving element comprises a four-division photodiode, and a intersection abscissa ($X_o$, $Y_o$) representative of the position of said light receiving element is calculated from $$X_o = \tan \alpha \cdot (h^2 + Y_o^2)^{1/2}, \text{ and}$$

$$Y_o = \tan((\pi/2) - \theta + \alpha) \cdot h,$$

wherein h is the height of the light receiving element, $\theta$ is the inclined angle of the light receiving element relative to the working surface, A, B, C, and D each is an output obtained from each of the four division portions of the light receiving element, $\alpha$ is an angle between the Y axis on the working surface and the line connecting the intersection with the point on the working surface of light receiving element, $\beta$ is an angle between the line connecting the intersection with the light receiving element and the optical axis of the light receiving element, and c is an optical factor depending on the configuration of the aperture and a distance between the light receiving element and the aperture, and $\tan \alpha = Rx/c$, $Rx = \{(A+D)-(B+C)\}/\{(A+D)+(B+C)\}$, $\tan \beta = Ry/c$, and $Ry = \{(A+B)-(C+DB)\}/\{(A+B)+(C+D)\}$.

* * * * *